(12) United States Patent
Nielsen et al.

(10) Patent No.: US 12,392,317 B2
(45) Date of Patent: Aug. 19, 2025

(54) WIND TURBINE BLADE AND METHOD FOR PRODUCING A WIND TURBINE BLADE

(71) Applicant: LM WIND POWER A/S, Kolding (DK)

(72) Inventors: Michael Wenani Nielsen, Kolding (DK); David Roberts, Kolding (DK); Rune Vestergaard, Kolding (DK); Maurits Bakkum, Kolding (DK)

(73) Assignee: LM WIND POWER A/S, Kolding (DK)

( * ) Notice: Subject to any disclaimer, the term of this patent is extended or adjusted under 35 U.S.C. 154(b) by 254 days.

(21) Appl. No.: 17/435,787

(22) PCT Filed: Mar. 10, 2020

(86) PCT No.: PCT/EP2020/056352
§ 371 (c)(1),
(2) Date: Sep. 2, 2021

(87) PCT Pub. No.: WO2020/182813
PCT Pub. Date: Sep. 17, 2020

(65) Prior Publication Data
US 2022/0145850 A1    May 12, 2022

(30) Foreign Application Priority Data
Mar. 12, 2019 (EP) .................................. 19162101

(51) Int. Cl.
*F03D 1/06* (2006.01)
*B29D 99/00* (2010.01)

(52) U.S. Cl.
CPC ....... *F03D 1/0675* (2013.01); *B29D 99/0028* (2013.01); *F05B 2230/23* (2013.01);
(Continued)

(58) Field of Classification Search
CPC ................. F03D 1/0675; F03D 1/0683; F05B 2240/304; F05B 2240/305; B29C 66/54
See application file for complete search history.

(56) References Cited

U.S. PATENT DOCUMENTS

| 9,759,187 B2 * | 9/2017 | Ruijter ................... F03D 1/0691 |
| 2010/0143146 A1 * | 6/2010 | Bell .......................... F03D 1/06 416/233 |

(Continued)

FOREIGN PATENT DOCUMENTS

| EP | 2116359 A1 | 11/2009 | |
| WO | WO-2008031913 A1 * | 3/2008 | ............. F03D 1/065 |

(Continued)

OTHER PUBLICATIONS

European Search Report issued on Aug. 26, 2019 for application No. EP19162101.0.
(Continued)

*Primary Examiner* — Nathaniel E Wiehe
*Assistant Examiner* — Art Golik
(74) *Attorney, Agent, or Firm* — Nath, Goldberg & Meyer; Jerald L. Meyer; Tanya E. Harkins

(57) ABSTRACT

Disclosed is a wind turbine blade and a method for its production. The wind turbine blade comprises an upwind side shell part and a downwind side shell part. The upwind side shell part and the downwind side part are bonded together along at least one joint. At said at least one joint, the upwind side shall part and the downwind side shell part are bonded at an internal glue flange as well as at an external glue flange. The glue flange can be produced by using a mould insert along which the glue flange is laminated.

19 Claims, 8 Drawing Sheets

(52) U.S. Cl.
CPC ... *F05B 2240/304* (2020.08); *F05B 2240/305* (2020.08); *F05B 2280/6003* (2013.01); *F05B 2280/6013* (2013.01); *F05B 2280/6015* (2013.01)

(56) References Cited

U.S. PATENT DOCUMENTS

| | | | | |
|---|---|---|---|---|
| 2010/0296940 | A1* | 11/2010 | Zuteck | F03D 1/0683 416/232 |
| 2013/0312900 | A1* | 11/2013 | Austinat | B29D 99/0028 156/245 |
| 2016/0177916 | A1* | 6/2016 | Dent | F03D 13/10 416/223 R |
| 2017/0252984 | A1* | 9/2017 | Ruijter | B29C 33/306 |
| 2019/0120205 | A1* | 4/2019 | Harada | F03D 1/0641 |

FOREIGN PATENT DOCUMENTS

| | | | |
|---|---|---|---|
| WO | 2013092359 | A2 | 6/2013 |
| WO | 2013092359 | A3 | 6/2013 |
| WO | 2017220596 | A1 | 12/2017 |
| WO | 2018015250 | A1 | 1/2018 |

OTHER PUBLICATIONS

International Search Report issued on May 13, 2020 for application No. PCT/EP2020/056352.

* cited by examiner

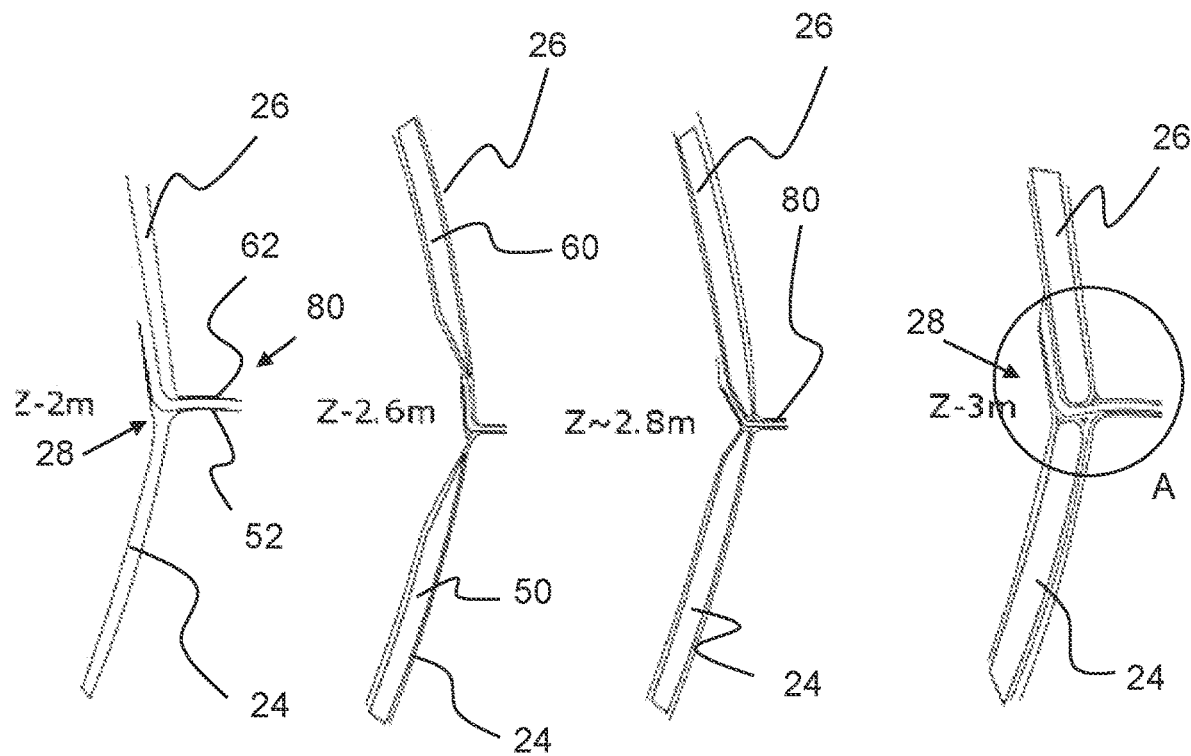
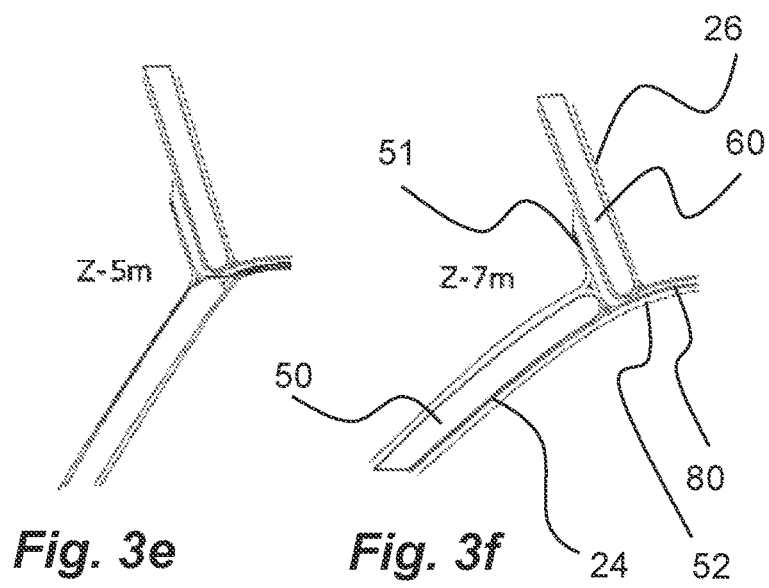
*Fig. 3a*  *Fig. 3b*  *Fig. 3c*  *Fig. 3d*
*Fig. 3e*  *Fig. 3f*

WIND TURBINE BLADE AND METHOD FOR PRODUCING A WIND TURBINE BLADE

This is a National Phase Application filed under 35 U.S.C. 371 as a national stage of PCT/EP2020/056352, filed Mar. 10, 2020, an application claiming the benefit of European Patent Application No. 19162101.0, filed Mar. 12, 2019, the content of each of which is hereby incorporated by reference in its entirety.

The present disclosure relates to a wind turbine blade and to a method of its production. The wind turbine blade comprises an upwind side part and a downwind side part which are bonded along at least one joint.

BACKGROUND

As wind turbines and wind turbine blades increase in size, the blade loads, i.e. strains, bending moments, peel loads etc., in particular along the trailing edge, increase. For this and other reasons, the design of the trailing edge is an important factor for the structural integrity of the wind turbine.

Turbine blades comprising a flatback profile at the trailing edge may have an increased efficiency. An optimized profile comprises a varying geometry of the trailing edge along the airfoil region of the blade. According to some embodiments, the trailing edge also comprises an aerodynamic flap, which reduces losses caused by air turbulences.

It is difficult to assemble a wind turbine blade which sustains high loads and which comprises subsections or segments that are scalable in geometry and strength. In particular, it is difficult to provide an aerodynamically optimized flatback profile at the trailing edge which also sustains high mechanical forces, while maintaining an optimized inner design and using minimal reinforcements and materials.

Document EP 2 909 474 A1 shows wind turbine blade with a flatback profile comprising shell parts with gluing flanges being arranged opposite to each other at the trailing edge.

SUMMARY

It is an object of the present invention to provide a wind turbine blade, which sustains high loads, and to provide a method for its manufacture.

The design advantageously allows for the wind turbine blade to be scalable in geometry, strength and/or layup design.

The object of the invention is achieved by a wind turbine blade and by a method of producing a wind turbine blade according to one or more of the claims presented herein.

Preferred embodiments of the invention are subject matter of the dependent claims, the description and the drawings.

The invention relates to a wind turbine blade, comprising:
an upwind side shell part and a downwind side shell part;
the upwind side shell part and the downwind side shell part being bonded together along at least one joint;
wherein, at said at least one joint, the upwind side shall part and/or the downwind side shell part are bonded at an internal glue flange as well as at an external glue flange.

A wind turbine blade typically comprises a root region, an airfoil region with a tip, a pressure side, a suction side and a chord line extending between a leading edge and a trailing edge.

The wind turbine blade comprises an upwind shell part and a downwind shell part.

Each shell part typically comprises a core, e.g. a polymer foam, which is laminated with glass and/or carbon fibre layers which are embedded in a polymer resin. The core may not extend through the entire length of the wind turbine blade, in particular, a tip end region may only comprise a fibre-reinforced laminate.

The core may also consist of at least two separate parts of varying geometry and/or located in at least two different sections of the wind turbine blade.

A core may also be placed between the glue flanges itself. Having e.g. a wide external glue flange, in particular an aerodynamic flap formed by an internal and external glue flange, may result in the need to include core material in the flange itself.

The internal glue flange may be embodied as an extension of the downwind side or upwind side shell part, which is placed adjacent to the inner side of the other shell part and which is bonded with glue to the inner side of the shell part. The external glue flange may be embodied as an extension of the downwind side shell part and/or upwind side shell part. Typically, the internal glue flange is located on the inside of the wind turbine blade, whereas the external glue flange is located on the outside of the wind turbine blade.

The glue flange can be embodied as an elongation, which is thinner as the adjacent main structural body of the shell part. When assembled with an opposing shell part, the glue flange forms a lap joint with a structural adhesive bond.

According to an embodiment of the invention, the upwind side shell part and the downwind side shell part both comprise a glue flange. According to this embodiment, the joint is formed between these two glue flanges. The glue flanges may form an aerodynamic flap. In a preferred embodiment, the upwind side shell part comprises an internal glue flange and an external glue flange, and the downwind side shell part comprises an external glue flange. The respective external glue flanges are preferably adapted to be glued to each other along at least part of the respective external glue flanges. The internal glue flange is preferably adapted to be glued to an inside surface of the opposing shell part, typically an inside surface of the downwind shell part.

The glue flanges of the upwind shell part may have a shape that matches with the shape of the downwind shell glue flange or the shape of the downwind laminate structure. So, a minimal bondline thickness can be achieved.

In a preferred embodiment, at least one shell part, preferably the upwind shell part, comprises an internal glue flange and an external glue flange, wherein the internal glue flange and the external glue flange together form an L-shaped profile, as seen in a cross section of the shell part.

According to another embodiment of the invention, only one of the shell parts comprises an external glue flange. In this case, the glue flange is bonded to the outer surface of the opposite shell part.

Using both, an internal as well as an external glue flange results in a bonded joint design which is scalable, e.g. by changing certain design parameters, different properties of the joint along its length are possible. An increase in the joint bending moment strength can be achieved e.g. by a varying number of reinforcement layers and/or a varying core thickness and/or a varying width of the bonded joint.

The joint design according to the invention offers the ability to adjust the bonded width along the length of the joint, e.g. to optimize shear load requirements. The design further allows for the shell sandwich panels to extend to the joint and to maximize the panel stability. The sandwich panels also help to reduce blade weight.

Furthermore, by using two glue flanges, a substantially constant bondline thickness can be achieved along the length of the blade, which enables low glue consumption. Preferably, the joint is placed at a trailing edge of the wind turbine blade and/or the trailing edge is embodied as a flatback trailing edge.

In particular, the flatback trailing edge may have a height which is reduced towards a blade root region and/or towards a tip end of the wind turbine blade. By means of the invention, an optimized aerodynamic profile of the airfoil region can be provided in a very simple and effective manner.

According to an embodiment of the invention, a flatback trailing edge may also extend all the way down to the root while using an internal and external glue flange.

The glue flange configuration according to the invention can also be used as a joint between a shell part and a flatback component, e.g. a C-stiffener-like component, with external flanges extending from both, upwind and downwind side shell parts. Hence, according to this embodiment, the shells are not directly bonded. However, at least one of the shell parts is bonded to the flatback component by an external as well as an internal glue flange.

According to a preferred embodiment of the invention, the external glue flange comprises an aerodynamic flap. As described above, the aerodynamic flap may be formed by the external glue flanges of the shell parts. According to this embodiment of the invention, an aerodynamic flap is formed by an extension of the upwind shell part, which is bonded to an extension of the downwind shell part.

The at least one glue flange can be embodied as a separate profile, which is bonded to the core of the wind turbine blade. A profile with any intended shape can be provided very easily.

However, according to a preferred alternative embodiment of the invention, the internal and/or external glue flange is formed by an extension of at least one laminate layer of the upwind and/or downwind side shell part. Accordingly, laminate layers of the shell part are extended to form the glue flange. This embodiment provides a very robust connection of the glue flange to the remaining shell part.

In one embodiment, the core (e.g. polymer foam) can be laminated with at least one fibre-reinforced layer. Then, at least one further fibre layer may be laminated onto the core and may also be used as extension to form the glue flange.

The end of the core of at least one shell part may have a varying shape over its length.

According to an embodiment of the invention, at least one moulded insert may be placed between the extension and a core of the upwind and/or downwind side shell part. The moulded insert reduces resin consumption and ensures a homogenous distribution of the resin. Furthermore, the risk of forming bubbles in the resin is reduced.

In particular, the moulded insert may be placed between the core, which is laminated with at least one fibre layer and the layers forming the extension. Preferably, the core comprises rounded edges. Sharp corners should be avoided to reduce the risk of cracks.

The moulded insert partially fills the space between the rounded edge and the laminate layer of the extension, which forms the glue flange. The use of the moulded insert also reduces the risk of forming resin pools and defects in the laminate structure.

The moulded insert can be embodied as a plastic insert. According to an embodiment of the invention, the moulded insert has, at least over a part of its length an essentially triangular cross section. This shape is optimal for filling the space between the core and the laminate layers of the extension. This also keeps the glue consumption low since the bondline thickness can be kept low over the entire width of the bondline.

In some embodiments, the moulded insert may have a varying cross section over its length.

According to one embodiment, at least one glue flange comprises, along a trailing edge, a varying number of laminate layers. According to another embodiment, at least one glue flange comprises, along a trailing edge, a varying width. According to another embodiment, at least one glue flange comprises, along a trailing edge, a varying thickness. Thus, it is possible in a very easy way, to adopt the design of the joint to the changing specific requirements over the length of the joint.

The height of an internal glue flange may be, at least section-wise, reduced towards a tip end of the wind turbine blade.

In particular, the internal glue flange may run out before reaching the tip end of the wind turbine blade.

According to this embodiment of the invention, the tip end area and/or an area of the airfoil region adjacent to the root of the wind turbine blade comprises a section without an internal glue flange. The trailing edge in these areas may have a lower height as in a section in the middle of the wind turbine blade. With the invention, it is very easy to produce a robust wind turbine blade with a flatback profile comprising a varying height along its length, without any significant sudden discontinuities in the structure of the wind turbine blade.

The invention further relates to a wind turbine which comprises wind turbine blades as described before.

In another aspect, the present invention relates to a method for producing a shell part of a wind turbine blade, the shell part comprising at least one glue flange, the method comprising the steps of arranging a core material and one or more first fibre layers in a blade mould, wherein preferably the core material is covered by the one or more first fibre layers to form a shell material, arranging one or more second fibre layers on at least part of the core material and/or the one or more first fibre layers, placing a mould inlay on at least part of the one or more second fibre layers and optionally wrapping the one or more second fibre layers around at least part of the mould inlay, curing the one or more second fibre layers to form the at least one glue flange, and removing the mould inlay.

The shell part may be an upwind shell part comprising both an external and an internal glue flange. Thus, in some embodiments, the external glue flange is formed by one or more second fibre layers arranged or wrapped around a first part of the mould inlay, wherein the internal glue flange is formed by the one or more second fibre layers arranged or wrapped around a second part of the mould inlay. The one or more second fibre layers may be cured with a resin to form the at least one glue flange, for example using vacuum-assisted resin transfer moulding.

In a preferred embodiment, the mould inlay is arranged on an edge of the blade mould such that it abuts a stopper protruding from said edge.

In another embodiment, the shell part comprises an internal and an external glue flange formed by the cured one or more second fibre layers.

According to another embodiment, the mould inlay has a varying cross section over its length.

In particular, the method is used for producing a shell part of a wind turbine blade of the present invention as described above.

According to one embodiment, a mould inlay is used to form the laminate of the at least one glue flange along the mould inlay. The mould inlay can be embodied as a profile and may comprise e.g. a polymer material, e.g. a polypropylene or a polyethylene.

The mould inlay which is preferably placed at the edge of the blade mould makes it easier to wrap the laminate layers around the inlay. In particular, first fibre layers may be wrapped around the core material and the second fibre layers may be wrapped around the mould inlay and may be shaped in order to form a glue flange.

According to an embodiment of the invention, the mould inlay is placed at a stopper of provided on the edge of the blade mould, thus facilitating correct placement of the mould inlay.

Preferably, an internal and external glue flange are wrapped and laminated along the mould inlay. The mould inlay also may have a varying cross section over its length.

In another aspect, the present invention relates to a shell part obtainable by the afore-described method. In another aspect, the present invention relates to a method of manufacturing a wind turbine blade comprising the steps of the afore-described method and bonding the obtained shell part to another shell part to obtain a wind turbine blade.

After the mould inlay is removed, the shell part, for example the upwind shell part, can be bonded to another shell part, for example the downwind shell part, in order to finalize the production of the wind turbine blade. In some embodiments, an arrestor formed as part of the glue flange can be either trimmed off or can be bonded to the opposing shell, in particular to an opposing glue flange.

The bonding process can be performed in any manner, e.g. by applying glue onto at least one surface first and then connecting the blade shell parts, or by an injection bonding process after the shell parts are placed upon each other.

An adhesive arrester can also be used in the bonding process, having the function to shape the adhesive in order to minimize a stiffness jump and/or to reduce the adhesive thickness to avoid adhesive cracks.

Embodiments and features described herein with regard to the wind turbine blade of the present invention may equally apply, and may be combined with, embodiments and features described herein with regard to the method for producing a shell part of a wind turbine blade of the present invention.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

FIG. 3a to FIG. 3f are cross sectional views of the trailing edge area of the wind turbine blade over a length along the blade

DETAILED DESCRIPTION

Figure 1:
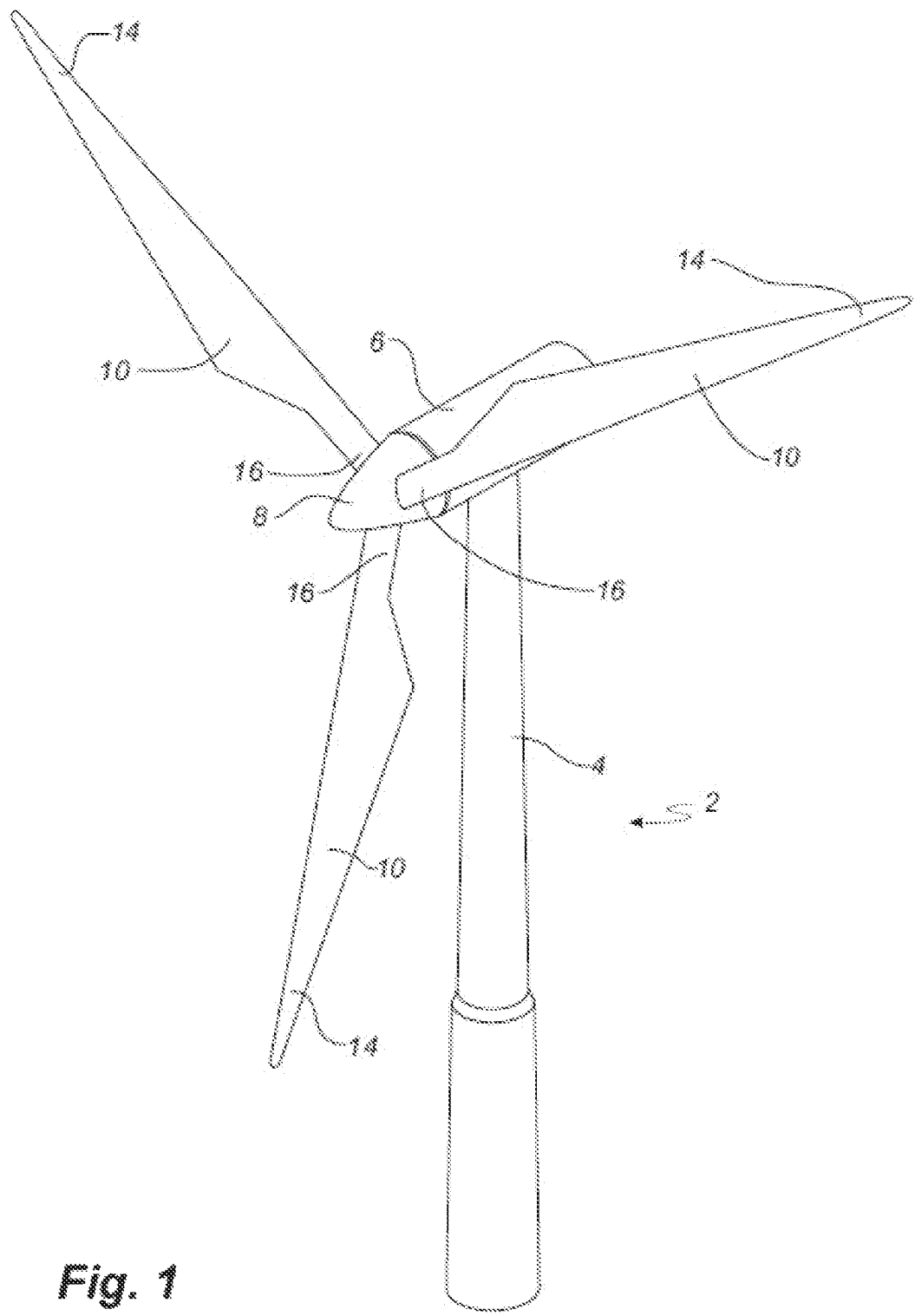
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
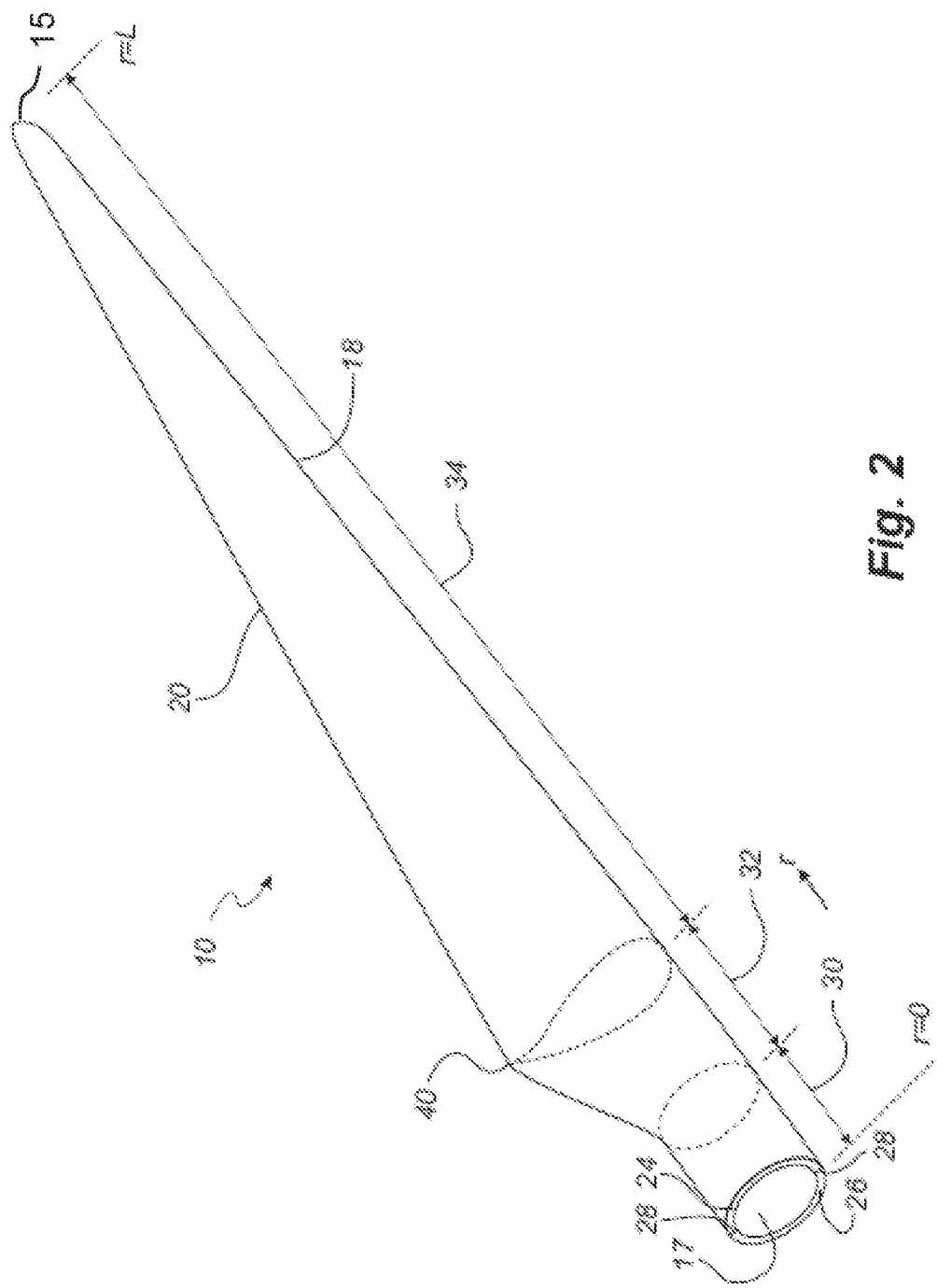
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 have a semi-circular or semi-oval outer cross-sectional shape.

The trailing edge 20 may be embodied as a flatback trailing edge, wherein the edge is flattened in order to achieve better aerodynamic properties. This construction increases the efficiency of the wind turbine blade in comparison with a sharp edge design.

FIG. 3a-FIG. 3f are cross sectional views of the joint area of a wind turbine blade along its trailing edge according to an embodiment of the invention beginning in the tip region (FIG. 3a) along the airfoil region.

As shown in FIG. 3a, the wind turbine blade comprises an upwind side shell part 24 and a downwind side shell part 26, which are bonded at the glue joint 28.

The upwind side shell part 24 and the downwind side shell part 26 both comprise an angled external glue flange 52, 62. The external glue flanges 52, 62 of the shell parts are bonded with glue and form an aerodynamic flap 80. In the area shown in FIG. 3a, the shell parts 24, 26 are embodied as monolithic laminates without a sandwich core.

As seen in FIG. 3f, the upwind side part 24 also comprises an internal glue flange 51 which is arranged adjacent to the inner surface of the downwind side part 26 and which is bonded with glue to the inner surface.

In the tip end region, the side shell parts 24, 26 consist of a fibre-reinforced laminate and may not comprise a core.

As shown in FIG. 3b to FIG. 3d, further away from the tip end region, the shell parts 24, 26 comprise respective cores 50, 60, e.g. a polymer foam core. Typically, the thickness of the cores 50, 60 increase with increasing distance from the tip end.

FIG. 3b and FIG. 3c illustrate how the thickness of the cores 50, 60 is gradually increases and that the edges of the cores 50, 60 are rounded.

Figure 4:
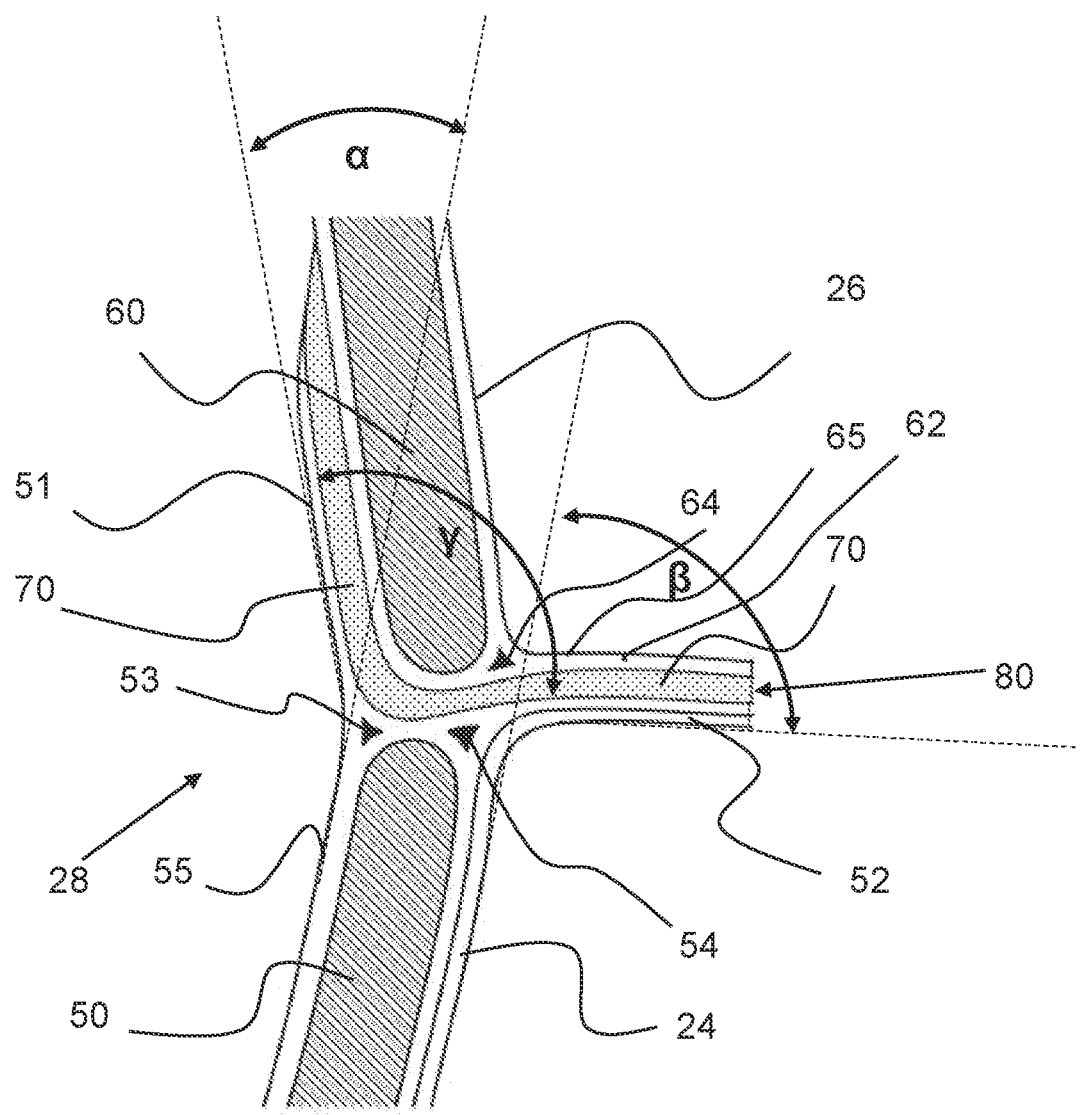
FIG. 4 is a detailed view of the area A of FIG. 3d FIG. 5a to FIG. 5c are cross sectional views of trailing edge of an embodiment of a wind turbine blade, wherein the internal glue flange runs out before reaching the root region of the blade, specifically showing a flatback trailing edge.

FIG. 4 is a detailed view of the area A of FIG. 3d. The upwind side shell part 24 comprises a polymer foam core 50. The core 50 may be wrapped with at least one fibre-reinforced layer. Further fibre layer(s) 55 form a laminate which builds an extension, forming the internal glue flange 51. The angled external glue flange 52 also consists of a laminate or fibre-reinforced layer(s) bonded to the laminate of the core 50.

In order to reduce the risk of cracks, the core 50 has rounded edges. Between the laminate layers of the glue flanges 51, 52 and the core, moulded inserts 53, 54 are placed in order to avoid resin pools and defects. The moulded inserts 53, 54 also reduce the consumption of resin. The rounded edge also allows full core material thickness all the way up to the shell edge, which results in an increased stiffness and potentially smoothens the lay-up off the fibre layers around the core 50 into the at least one glue flange 51, 52.

Preferably, the moulded inserts 53, 54 have an essentially triangular shape. The shape of the moulded inserts 53, 54 may vary along the length of the edge. The moulded inserts 53, 54 may only be placed in a section of the wind turbine blade.

The external glue flange 52 of the upwind side shell part 24 is bonded with glue 70 to the external glue flange 62 of the downwind side shell part 26 in order to form an aerodynamic flap 80 and an external blade joint.

A moulded insert 64 is also placed between the fibre layers 65 of the laminate of the external glue flange 62 of the downwind side shell part 26 and the core 60.

The internal glue flange 51 of the upwind side shell part 24 is bonded with glue 70 to an inner surface of the downwind side shell part 26. Internal glue flange 51 and external glue flange 52 form an L-shaped profile onto which glue can be applied in order to bond the shell parts 24, 26 together.

The internal glue flange 51 may run to the adjacent surface of the upwind side shell part at an angle α between 0° and 90°, preferably between 0° and 45°. The external glue flange 52 may run to the adjacent surface of the upwind side shell part at an angle β between 0° and 120°, preferably between 0° and 90°.

It is possible to vary the angle of the internal glue flange 51 and the external glue flange 52 depending on the position along the trailing edge. According to an embodiment of the invention, the angle of the internal glue flange 51 and/or the external glue flange 52 decreases or increases along the trailing edge by at least 30°.

Preferably, the angle γ between the internal glue flange 51 and the external glue flange is between 70° and 110°, preferably between 80 and 100°.

Referring back to FIG. 3a-3f, it is shown that the design of the joint between the shell parts is flexible and can vary along the length of the blade.

As shown in FIG. 3f, the cores 50, 60 of the bonded ends of the shell parts 24, 26 can also be placed in an angular position to each other. At the position of the glue joint 28 shown in FIG. 3f, the internal glue flange 51 of the downwind side shell part 24 is angled and the external glue flange 52 follows the contour of the outer surface of the upwind side shell part 24. The front of the downwind side shell part 26 is bonded to the external glue flange 52 of the upwind side shell part 24.

Figure 5A:
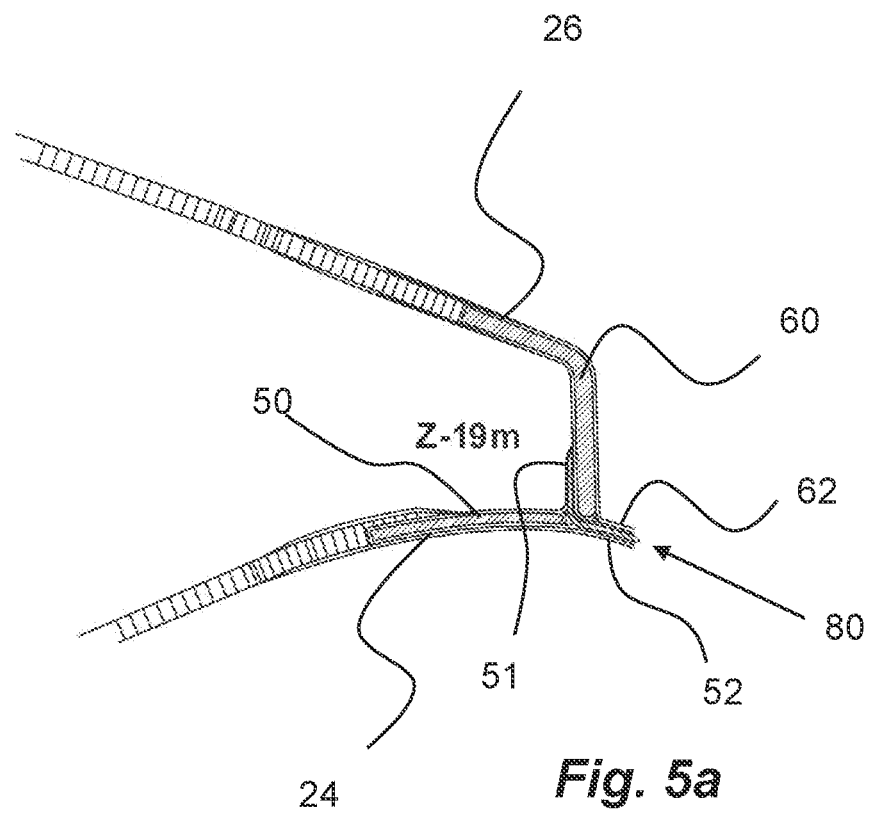
Figure 5B:
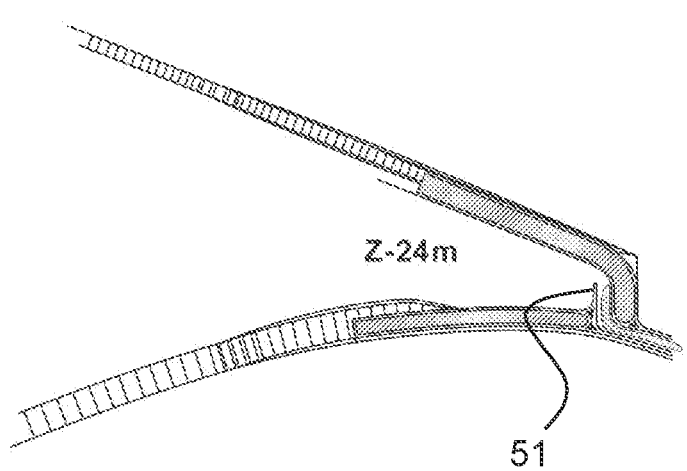

Accordingly, according to an embodiment of the invention, the glue joint may comprise an area, wherein the cores 50, 60 of the shell parts 24, 26 are aligned front towards front as well as an area wherein the front of one core 50 is placed adjacent to the side of the other core 60 (e.g. shown in FIG. 5b).

Figure 5C:
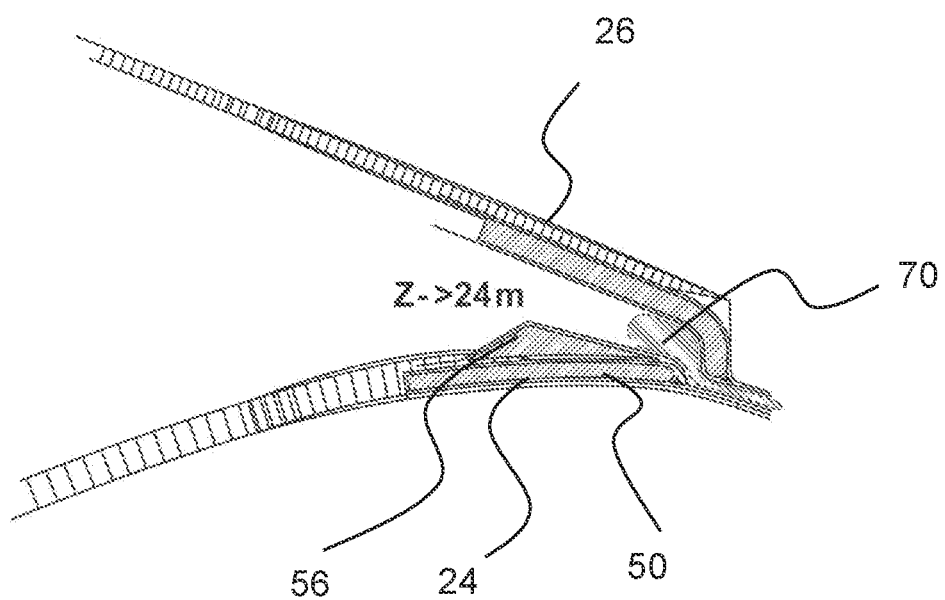

FIG. 5a to FIG. 5c show further cross-sectional views of the glue joint area of a wind turbine blade with increasing distance from the tip end, wherein the internal glue flange 51 runs out or diminishes before reaching the blade root region.

The profile according to FIG. 5a essentially corresponds with FIG. 3f. The downwind side shell part 26 comprises an angled end which is bonded to the internal glue flange 51 of the upwind side shell part 24. The external glue flanges 52, 62 form an aerodynamic flap 80.

In this area, the core 50 of the upwind side shell part 24 is thinner than the core 60 of the downwind side shell part. Accordingly, the downwind side shell part 24 can withstand higher forces and sheer loads.

As shown in FIG. 5b, the height of the flatback profile decreases towards the blade root. Therefore, the height of the internal glue flange 51 also decreases towards the blade root. According to the sectional drawing of FIG. 5c, the height of the internal glue flange is reduced to zero towards the root region of the blade.

The inner surface of the downwind side shell part 26 is now directly bonded with glue 70 to the inner side of the upwind side shell part 24. The external glue flanges 52, 62 of the shells 24, 26 still form an aerodynamic flap. The end of the downwind side shell part 26 is still angled.

In order to maintain a thin bondline, the upwind side shell part 24 (or the downwind side shell part) may comprise a core insert 56 or a local increase of the thickness of the core 50 in this area. The core insert 56 is arranged upon the core 50 or the upwind side shell part 24. Preferably, the core insert 56 consists of a polymer foam. The core insert 56 tapers towards the trailing edge and/or has an essentially triangular cross section.

Figure 6:
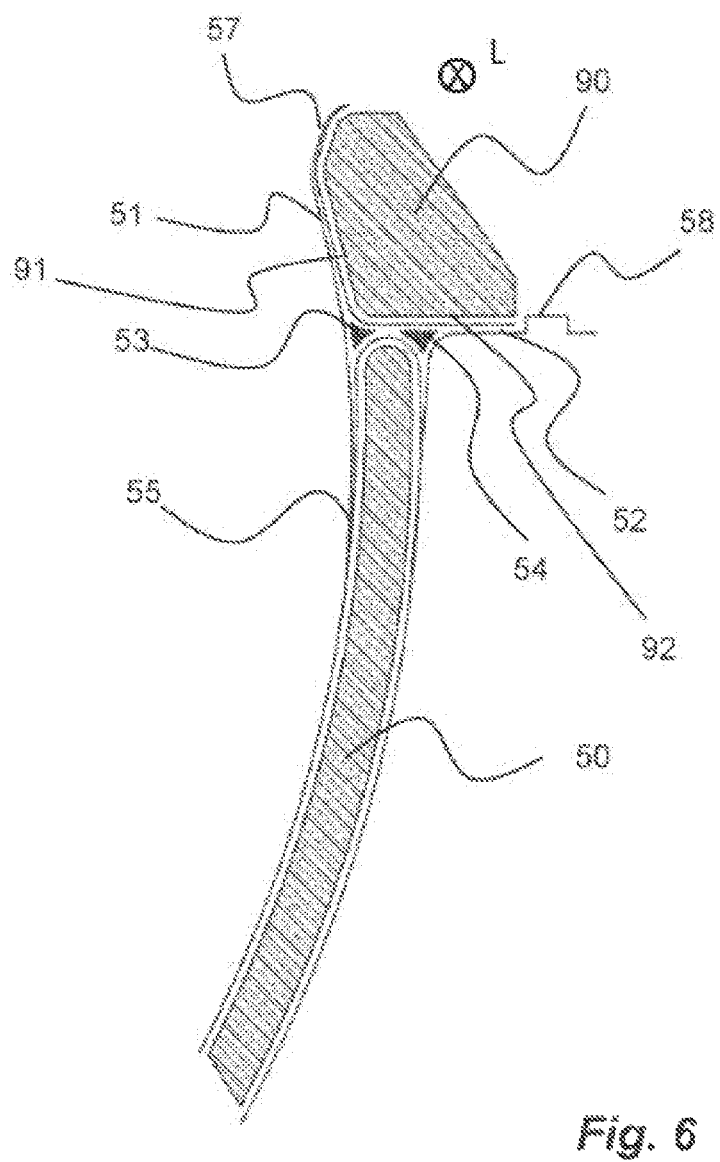
FIG. 6 is a schematic cross sectional view illustrating the production of a glue flange of the blade.

With reference to FIG. 6, the manufacturing of a shell part comprising two glue flanges 51, 52 is explained in more detail. For manufacturing the glue flanges 51, 52, a mould inlay 90 is used, which will be removed after the resin has cured. The mould inlay 90 has a three-dimensional shape adapted to the desired profile of the airfoil region. Accordingly, the cross section of the mould inlay 90 varies over its length L.

In this embodiment, a stopper 58 is arranged on a blade mould edge. The stopper 58 can be provided by a profile (e.g. a plastic profile) which is arranged on or within the blade mould. The stopper 58 is a key reference point to enable the desired alignment.

The laminate of this glue flange 52 is applied to a contact surface 92 of the mould inlay 90. The stopper 58 provides an exactly aligned position of the mould inlay 90.

The mould inlay 90 further provides a contact surface for the second glue flange 51. This glue flange 51 is formed by laminate layers comprising fibre layers 55 which also cover the core 50. Moulded inserts 53, 54 may be placed between the rounded edges of the core 50 and laminate layers of the glue flanges 51, 52.

In order to facilitate wrapping the laminate of the glue flange 52 around the mould inlay 90, the glue flange 52 may be provided with an arrestor 57, which extends beyond the glue flange 52. The arrestor 57 can be wrapped around the edge of the mould inlay 90 and ensures an exact fit of the glue flange 51. Preferably, the arrestor 47 is ending in the edge region of the mould inlay 50.

The arrestor 57 may be provided by an extension of the laminate of the internal glue flange 51. Preferably, this extension is thinner than the remaining glue flange 51. This can be achieved e.g. by using a reduced number of laminate layers. After the resin is cured, the arrestor 57 can be cut off.

Instead of using an arrestor, an external mould could also be used to shape the glue flange 51 (not shown). However, this method of production is more difficult to handle.

Figure 7:
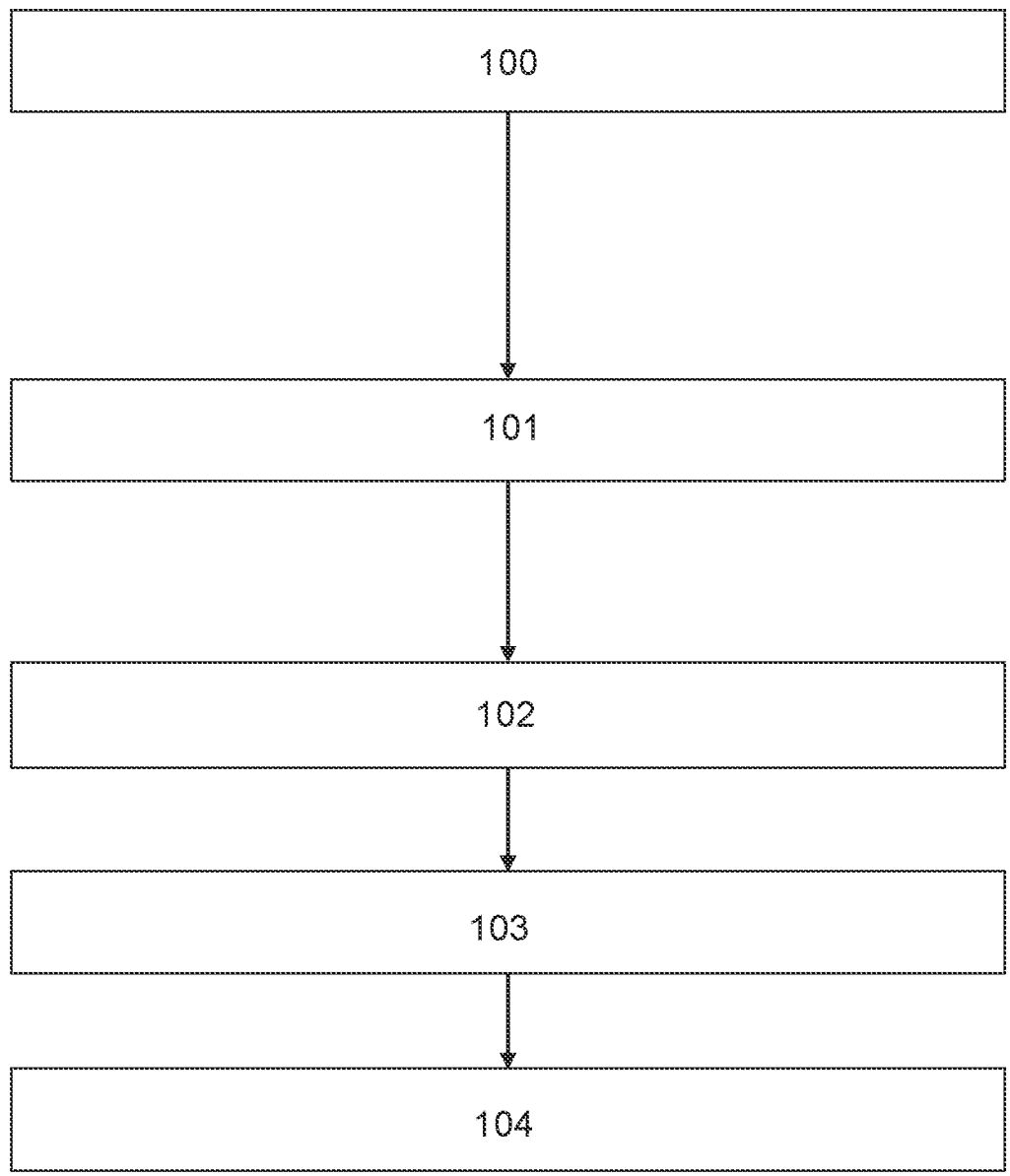
FIG. 7 is a flow chart, showing a method of producing a wind turbine blade according to an embodiment of the invention.

FIG. 7 is a flow chart, illustrating a method for producing a shell part of a wind turbine blade, the shell part comprising at least one glue flange. First, a core material and one or more first fibre layers are arranged in a blade mould; step 100. Then, one or more second fibre layers are arranged on at least part of the core material and/or the one or more first fibre layers; step 101. Then, the method includes the steps of placing 102 a mould inlay on at least part of the one or more second fibre layers and optionally wrapping the one or more second fibre layers around at least part of the mould inlay, curing 103 the one or more second fibre layers to form the at least one glue flange, and removing 104 the mould inlay. In order to produce the wind turbine blade, glue is applied onto the glue flange and one shell part is bonded to another shell part. Alternatively, the glue can be also injected into the cavity which formed between the parts, when the shell parts are placed adjacent to each other.

By providing a wind turbine blade with an internal as well as an external glue flange, it is possible to provide an aerodynamically optimized flatback profile which sustains high mechanical stresses. By using such a flatback profile with a variable height of the trailing edge, it is possible to increase the annular energy output by approximately 1%. Furthermore, the chord width can be reduced.

The invention has been described with reference to preferred embodiments. However, the scope of the invention is not limited to the illustrated embodiments, and alterations and modifications can be carried out without deviating from the scope of the invention.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (upwind/pressure side shell part)
26 second blade shell part (downwind/suction side part)
28 bond lines/glue joints
30 root region
32 transition region
34 airfoil region
40 shoulder
50 core (upwind side shell part)
51 internal glue flange
52 external glue flange
53 moulded insert
54 moulded insert
55 fibre layers
56 core insert
57 arrestor
58 stopper
60 core (downwind side shell part)
62 external glue flange
64 moulded insert
65 fibre layers
70 glue
80 aerodynamic flap
90 mould inlay
91 contact surface
92 contact surface
100 arranging a core material and one or more first fibre layers in a blade mould
101 arranging one or more second fibre layers on at least part of the core material and/or the one or more first fibre layers
102 placing a mould inlay on at least part of the one or more second fibre layers
103 curing the one or more second fibre layers to form the at least one glue flange
104 removing 104 the mould inlay

The invention claimed is:

1. A wind turbine blade, comprising:
an upwind side shell part and a downwind side shell part,
wherein the upwind side shell part and the downwind side shell part are bonded together along at least one joint,
wherein at least one of the upwind side shell part and the downwind side shell part comprises both an internal glue flange and an external glue flange,
wherein, at said at least one joint, the upwind side shell part and/or the downwind side shell part are bonded at the internal glue flange and the external glue flange,
wherein the internal glue flange and the external glue flange together form an L-shaped cross-sectional profile, and wherein the external glue flange projects external to the upwind side shell part and the downwind side shell part, on an outside of the wind turbine blade.

2. The wind turbine blade according to claim 1, wherein the at least one joint is located at a trailing edge and/or at a leading edge of the wind turbine blade.

3. The wind turbine blade according to claim 2, wherein the trailing edge is a flatback trailing edge.

4. The wind turbine blade according to claim 1, wherein the external glue flange forms an aerodynamic flap.

5. The wind turbine blade according to claim 1, wherein the internal glue flange and/or the external glue flange is formed by an extension, the extension comprising at least one fibre layer of the upwind side shell part and/or downwind side shell part.

6. The wind turbine blade according to claim 5, wherein at least one insert is placed between the extension and a core of the upwind and/or downwind shell part.

7. The wind turbine blade according to claim 6, wherein at least one insert comprises a moulded insert.

8. The wind turbine blade according to claim 1, wherein an aerodynamic flap is formed by an extension of the upwind side shell part, which is bonded to an extension of the downwind side shell part.

9. The wind turbine blade according to claim 1, wherein at least one of the internal and external glue flanges comprise, along a trailing edge, a varying number of fibre layers, a varying height, a varying width and/or a varying thickness.

10. The wind turbine blade according to claim 1, wherein a height of the internal glue flange decreases towards a tip end of the wind turbine blade, at least along part of the internal glue flange.

11. The wind turbine blade according to claim 1, wherein the internal glue flange diminishes towards a root region and/or towards a tip end of the blade.

12. The wind turbine blade according to claim 11, wherein the internal glue flange terminates before reaching the root region and/or the tip end of the blade.

13. A wind turbine, comprising a wind turbine blade according to claim 1.

14. A method for producing a shell part of a wind turbine blade, the method comprising the steps of:
    arranging a core and one or more first fibre layers in a blade mould;
    arranging one or more second fibre layers on at least part of the core and/or the one or more first fibre layers;
    moving a mould inlay onto at least part of the one or more second fibre layers and wrapping the one or more second fibre layers around at least part of the mould inlay;
    curing the one or more second fibre layers to form at least one glue flange; and
    removing the mould inlay,
    wherein the at least one glue flange comprises an internal glue flange and an external glue flange, the shell part comprising the internal glue flange and the external glue flange formed by the cured one or more second fibre layers, and
    wherein the external glue flange is located on an exterior of the shell part.

15. The method according to claim 14, wherein the mould inlay is arranged on an edge of the blade mould such that it abuts a stopper protruding from said edge of the blade mould.

16. The method according to claim 14, wherein the mould inlay has a varying cross section over its length.

17. A wind turbine blade, comprising:
    an upwind side shell part and a downwind side shell part,
    wherein the upwind side shell part and the downwind side shell part are bonded together along at least one joint,
    wherein, at said at least one joint, the upwind side shell part and/or the downwind side shell part are bonded at an internal glue flange as well as at an external glue flange, and
    wherein at least one of the internal and external glue flanges comprise along a trailing edge, a varying number of fibre layers, a varying height, a varying width and/or a varying thickness.

18. A wind turbine blade, comprising:
    an upwind side shell part and a downwind side shell part,
    wherein the upwind side shell part and the downwind side shell part are bonded together along at least one joint,
    wherein, at said at least one joint, the upwind side shell part and/or the downwind side shell part are bonded at an internal glue flange as well as at an external glue flange, and
    wherein a height of the internal glue flange decreases towards a tip end of the wind turbine blade, at least along part of the internal glue flange.

19. A wind turbine blade, comprising:
    an upwind side shell part and a downwind side shell part,
    wherein the upwind side shell part and the downwind side shell part are bonded together along at least one joint,
    wherein, at said at least one joint, the upwind side shell part and/or the downwind side shell part are bonded at an internal glue flange as well as at an external glue flange, and
    wherein the internal glue flange diminishes towards a root region and/or towards a tip end of the wind turbine blade.

* * * * *